No. 735,681. PATENTED AUG. 4, 1903.
C. H. STONEBRIDGE.
COLLAPSIBLE LANTERN CASING.
APPLICATION FILED MAR. 13, 1902. RENEWED JAN. 10, 1903.
NO MODEL.
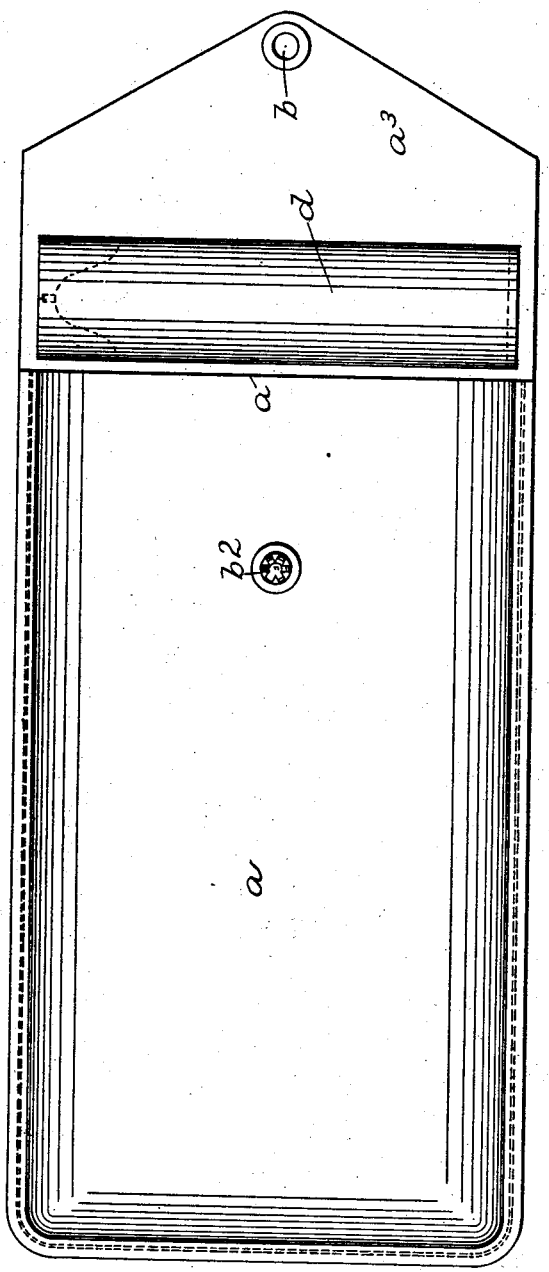
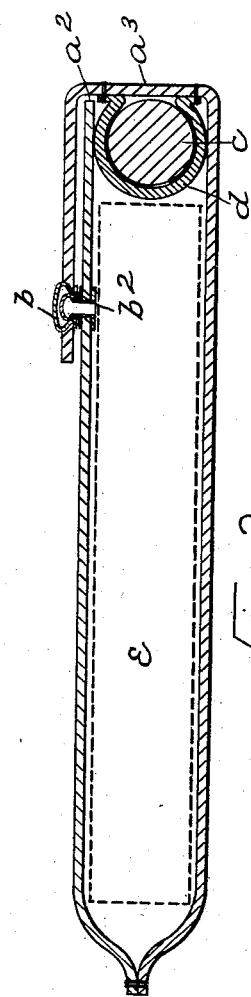
WITNESSES
INVENTOR
Charles H. Stonebridge
BY
ATTORNEYS No. 735,681. Patented August 4, 1903.

UNITED STATES PATENT OFFICE.

CHARLES H. STONEBRIDGE, OF NEW YORK, N. Y.

COLLAPSIBLE-LANTERN CASING.

SPECIFICATION forming part of Letters Patent No. 735,681, dated August 4, 1903.

Application filed March 13, 1902. Renewed January 10, 1903. Serial No. 138,521. (No model.)

*To all whom it may concern:*

Be it known that I, CHARLES H. STONEBRIDGE, a citizen of the United States, residing at New York, in the county of New York and State of New York, have invented certain new and useful Improvements in Collapsible-Lantern Casings, of which the following is a full and complete specification, such as will enable those skilled in the art to which it appertains to make and use the same.

The object of this invention is to provide an improved casing or holder for collapsible lanterns which is designed to receive and hold the lantern when the separate parts thereof are compactly folded together and also a candle for use in said lantern, a further object being to provide a casing or receptacle for a collapsible lantern such as is described and claimed in United States Letters Patent No. 662,474, granted to me November 27, 1900, and with this and other objects in view the invention consists in a device of the class specified constructed as hereinafter described and claimed.

In the drawings forming part of this specification, in which the separate parts of my improvement are designated by the same reference characters in each of the views, Figure 1 is a side view of my improved casing or receptacle for collapsible lanterns and showing the same open; and Fig. 2, a longitudinal section showing the same closed, the lantern being also indicated therein.

In the practice of my invention I provide a casing or receptacle $a$, which is preferably composed of comparatively stiff leather, but which may be composed of any desired material, and which is open at one end, as shown at $a^2$, the back portion thereof being provided at said end with a flap $a^3$, which is adapted to be folded over the open end of the casing or receptacle and secured to the front thereof, as shown in Fig. 2, said flap and said front of the casing or receptacle being provided with the separate parts $b$ and $b^2$ of a fastening device similar to an ordinary glove-fastener. The casing or receptacle as thus made consists of a pocket, which is closed by the flap $a^3$, and secured transversely of said flap closely adjacent to the mouth of the pocket, casing, or receptacle is a candle-holder $d$, adapted to receive a candle $c$, the candle-holder $d$ being also composed of leather or other suitable material and being of such shape and size as to receive and hold a short candle therein, the length of the candle and of the candle-holder being such that when the flap $a^3$ is folded over and secured to the front of the casing or receptacle the said candle and candle-holder will fit in the open end of said casing or receptacle, as clearly shown in Fig. 1.

The position of the collapsible lantern in the casing or receptacle is represented at $e$ in Fig. 2 by dotted lines, and said lantern when the separate parts thereof are folded together is slightly shorter than the casing or receptacle, as is also shown in Fig. 2, the difference between the length of the lantern and the length of the casing or receptacle being about equal to the transverse diameter of the candle-holder $d$. The folding of the flap $a$ so as to close the casing or receptacle, as shown in Fig. 2, also securely holds the candle $c$ in the holder $d$, the ends of the holder being closed by the adjacent portions of the casing or receptacle, and when the lantern is taken out of the casing or receptacle and set up for use the candle is removed from the holder $d$ and placed therein.

This device is particularly adapted to accomplish the result for which it is intended, and it is also particularly adapted for use by sportsmen, hunters, and others of this class who may desire to carry a lantern in a pocket or who desire to have a lantern ready for use at all times and also desire to be able to carry the same or any number thereof in a bag, valise, trunk, or other receptacle.

Having fully described my invention, what I claim as new, and desire to secure by Letters Patent, is—

A casing or receptacle for collapsible lanterns, said casing being oblong and substantially rectangular in form and being open at one end, and one side thereof at the open end being extended to form a flap which is adapted to be folded over said open end and to be secured to the other side, and a tubular candle-holder open at both ends and connected with said flap transversely thereof and adjacent to the open end of the casing or receptacle, said candle-holder being adapted to enter within the open end of the casing or receptacle when said flap is folded over said end and secured, substantially as shown and described.

In testimony that I claim the foregoing as my invention I have signed my name, in presence of the subscribing witnesses, this 11th day of March, 1902.

CHARLES H. STONEBRIDGE.

Witnesses:
 F. A. STEWART,
 F. F. TELLER.